United States Patent Office 3,826,791
Patented July 30, 1974

---

3,826,791
HETEROCYCLIC AMIDES OF 4-HYDROXY-2H-1-BENZOTHIOPYRAN-3-CARBOXYLIC ACID 1,1 - DIOXIDE AND PROCESS FOR THEIR PRODUCTION
Harold Zinnes, Rockaway, and Neil A. Lindo, Chatham, N.J., assignors to Warner-Lambert Company, Morris Plains, N.J.
No Drawing. Original application Apr. 28, 1972, Ser. No. 248,509, now Patent No. 3,769,292, dated Oct. 30, 1972. Divided and this application Apr. 9, 1973, Ser. No. 349,354
Int. Cl. C07d 31/50
U.S. Cl. 260—294.8 C
2 Claims

ABSTRACT OF THE DISCLOSURE

Compounds of the formula:

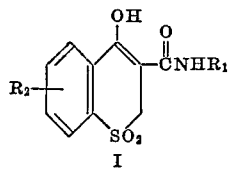

I wherein $R_1$ is an aromatic heterocyclic group and $R_2$ is hydrogen, alkyl, aralkyl, alkoxy, halogen, cyano, nitro, trifluoromethyl, etc., are disclosed. These compounds are useful as anti-inflammatory agents.

---

CROSS REFERENCE TO RELATED APPLICATION

This is a division of application Ser. No. 248,509, filed Apr. 28, 1972, now U.S. Pat. No. 3,769,292 dated Oct. 30, 1972.

The present invention is concerned with novel heterocyclic amides of 4-hydroxy-2H-1-benzothiopyran-3-carboxylic acid 1,1-dioxide and the process for their production, having the following structural formula:

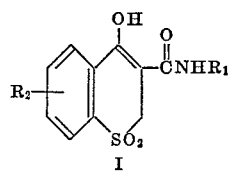

I wherein $R_1$ is an aromatic heterocyclic group such as pyridyl, pyrimidyl, thiazolyl, isoxazolyl, furyl, thienyl and the like and $R_2$ is hydrogen, lower alkyl, phenyl, benzyl, lower alkoxy, halogen, cyano, nitro, or trifluoromethyl and the like. The aromatic heterocyclic group may also be substituted by groups such as lower alkyl, phenyl, benzyl, lower alkoxy, halogen, cyano, nitro, trifluoromethyl and the like.

The present invention also encompasses within its scope a novel process for the production of the above compounds.

The compounds of this invention are useful as anti-inflammatory agents. For example, when they are administered orally or intraperitionally to laboratory animals such as rats, at a dose of 10–200 mg./kg., they reduce the swelling in the paw which had been previously induced by injection of an irritant such as carrageenin.

These compounds are indicated in conditions where the soft tissues are inflamed, such as in rhenumatoid arthritis. A dose of 10–200 mg./kg. in several divided doses daily orally or by injection is recommended.

In order to use these compounds, they are formulated with pharmaceutical diluants such as lactose and compounded into dosage forms such as tablets. Alternatively, they can be formulated with a sterile vehicle such as water for injection and compounded into suspensions suitable for parenteral administration. Since these compounds are acids they can be converted to metal or amine salts and the like. The pyridyl compounds are amphoteric. Thus they can also form acid addition salts. These salts are formed by conventional procedures, e.g., by treating the compound with an alkali such as sodium or potassium hydroxide and then recovering the salts.

According to the present invention, the above compounds are prepared by subjecting a β-ketoester having the following structural formula to aminolysis:

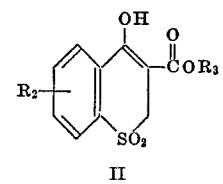

II wherein $R_3$ is aryl or alkyl. This process is desirably carried out by refluxing said compound II with an amine of the formula $R_1NH_2$ in an inert solvent such as xylene in the presence of a molecular sieve. The molecular sieve serves to remove the alcohol which is formed in the reaction.

The starting compound II is prepared in accordance with the description set forth in W. J. Still, et al., *J.O.C.*, 33, 2730 (1968).

In order to further illustrate the practice of the invention, the following example is included:

EXAMPLE 1

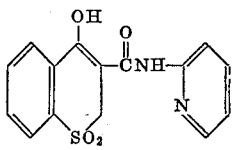

4-hydroxy-N-(2 - pyridyl)-2H-1-benzothiopyran-3-carboxamide, 1,1-dioxide.—A mixture of 9.4 g. (0.04 mole) of methyl 4-hydroxy-2H-1-benzothiopyran-3-carboxylate, 1,1-dioxide, 5.2 g. (0.06 mole) of 2-aminopyridine, and 250 ml. of xylene was reuxed for 16 hrs. in a Soxhlet apparatus, the thimble of which contained 20 g. of Linde type 4A molecular sieve. The mixture was cooled to room temperature and the resulting crystalline precipitate (wgt. 8.6 g.; m.p. 236–238° dec.) was collected. It was recrystallized from acetic acid to give 6.4 g. of material, m.p. 236–238° dec.

*Analysis.*—Calcd. for $C_{15}H_{12}N_2O_4S$: C, 56.95; H, 3.82; N, 8.86; S, 10.14. Found: C, 56.70; H, 3.77; N, 8.73; S, 10.39.

We claim:
1. A process for the production of a compound of the formula

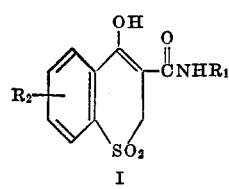

I which comprises refluxing together a compound of the formula:

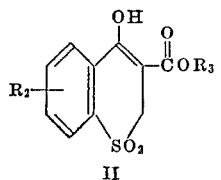

II in which $R_2$ is hydrogen, lower alkyl, phenyl, benzyl, lower alkoxy, halogen, cyano, nitro or trifluoromethyl, and $R_3$ is alkyl or aryl with a compound of the formula $R_1NH_2$ in which $R_1$ is pyridyl or pyridyl substituted by lower alkyl, phenyl, benzyl, lower alkoxy, cyano, nitro or trifluoromethyl substituents in an inert solvent in the presence of a molecular sieve.

2. A process according to claim 1 wherein $R_1$ is 2-pyridyl and $R_2$ is hydrogen.

References Cited
UNITED STATES PATENTS

| | | |
|---|---|---|
| 3,133,918 | 5/1964 | MacPhillamy et al. 260—294.8 C |
| 3,163,645 | 12/1964 | DeStevens et al. 260—294.8 C |

ALAN L. ROTMAN, Primary Examiner

U.S. Cl. X.R.

260—256.4 N, 306.8 R, 307 H, 327 TH; 424—251, 266, 270, 272, 275